(12) United States Patent
Benardeau (10) Patent No.: US 7,802,106 B2
(45) Date of Patent: Sep. 21, 2010

(54) METHOD AND SYSTEM FOR GUARANTEEING THE INTEGRITY OF AT LEAST ONE SOFTWARE PROGRAM WHICH IS TRANSMITTED TO AN ENCRYPTION/DECRYPTION MODULE AND RECORDING MEDIA FOR IMPLEMENTING SAME

(75) Inventor: Christian Benardeau, Bussy-Saint-Georges (FR)

(73) Assignee: Logiways France, Brive-la-Gaillarde (FR)

( * ) Notice: Subject to any disclaimer, the term of this patent is extended or adjusted under 35 U.S.C. 154(b) by 983 days.

(21) Appl. No.: 10/542,630

(22) PCT Filed: Dec. 3, 2003

(86) PCT No.: PCT/FR03/03578

§ 371 (c)(1),
(2), (4) Date: Apr. 24, 2006

(87) PCT Pub. No.: WO2004/073307

PCT Pub. Date: Aug. 26, 2004

(65) Prior Publication Data

US 2006/0259780 A1    Nov. 16, 2006

(30) Foreign Application Priority Data

Jan. 17, 2003   (FR) .................................. 03 00525

(51) Int. Cl.
*H04L 9/00*   (2006.01)
*G06F 12/14*   (2006.01)

(52) U.S. Cl. ....................... 713/189; 380/240; 713/181; 726/4; 726/21; 726/27

(58) Field of Classification Search .................. 713/189, 713/181; 726/2–4, 21, 27; 380/239–242
See application file for complete search history.

(56) References Cited

U.S. PATENT DOCUMENTS 5,029,207 A * 7/1991 Gammie ..................... 380/228

(Continued)

FOREIGN PATENT DOCUMENTS

WO     WO 98 43425     10/1998

(Continued)

OTHER PUBLICATIONS

Menezes, et al. Handbook of Applied Cryptography. Boca Raton, FL. CRC Press LLC, 1997, p. 364.*

(Continued)

*Primary Examiner*—Benjamin E Lanier
*Assistant Examiner*—Hadi Armouche
(74) *Attorney, Agent, or Firm*—Young & Thompson (57) ABSTRACT

A method of guaranteeing the integrity of at least one computer software program transmitted by a transmitter to a decoder which is equipped with an encryption/decryption module via a long-distance information transmission network. The inventive method includes inserting (at 52) a supplementary piece of information into a message containing the information necessary for the decoder to decrypt the information signals transmitted by the transmitter, the supplementary information enabling the encryption/decryption module to verify that it has effectively received each computer software program transmitted.

19 Claims, 4 Drawing Sheets

U.S. PATENT DOCUMENTS 5,598,530 A * 1/1997 Nagae .................. 714/21
2002/0129249 A1 * 9/2002 Maillard et al. ............ 713/172

FOREIGN PATENT DOCUMENTS

WO     WO 01 61437     8/2001
WO     WO 0161437 A2 * 8/2001

OTHER PUBLICATIONS

Husemann D:,"Standards in the smart card world", Computer Networks, Elsevier Science Publishers B.V., Amsterdam, NL, vol. 36, No. 4, Jul. 16, 2001, pp. 473-487, XP004304910, ISSN: 1389-1286, p. 475, col. Gauche, paragraph Dernier.

* cited by examiner

METHOD AND SYSTEM FOR GUARANTEEING THE INTEGRITY OF AT LEAST ONE SOFTWARE PROGRAM WHICH IS TRANSMITTED TO AN ENCRYPTION/DECRYPTION MODULE AND RECORDING MEDIA FOR IMPLEMENTING SAME

CROSS-REFERENCE TO RELATED APPLICATIONS

The Applicant claims priority to and incorporates by reference PCT/FR2003/003578 filed Dec. 3, 2003 and French Application 03/00525 filed Jan. 17, 2003.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

The invention relates to a method and system for ensuring the integrity of at least one computer software program which can be carried out by means of at least one encryption/decryption module, the at least one software program being transmitted, by means of a transmitter, to a decoder which is equipped with the at least one encryption/decryption module by means of a long-distance information transmission network.

2. Description of Related Art

More precisely, the invention relates to a method in which the transmitter carries out:

a) a step for encrypting information signals transmitted to the decoder, b) a step for transmitting, to the at least one encryption/decryption module of the decoder, a message containing the information required for the decoder to decrypt the information signals transmitted at step a), and c) a step for transmitting the at least one computer software program to the at least one encryption/decryption module of the decoder, and in which the decoder carries out:

d) a step for decrypting the information signals transmitted by the transmitter during step a) using the information provided for this purpose in the message transmitted during step b).

Methods of this type are, for example, required in payment-based systems for broadcasting television channels. In these systems, in order to update the decoders, the transmitter frequently broadcasts corrective software programs which are intended to be carried out by each of the decoders in order to update the functionality thereof. A corrective software program is a small program which can be carried out by an electronic computer and which is intended to modify specific parameters or parts of a larger program which can be carried out by the same computer. These corrective software programs are also known in English as "patches".

In conventional manner, each decoder is equipped with an encryption/decryption module which is capable of encrypting and/or decrypting the signals transmitted by the transmitter in order to decrypt the television channels transmitted. This module is conventionally referred to as a security module since it serves to secure the information exchanges between the transmitter and the decoder. This encryption/decryption module is also capable of carrying out the corrective software programs which it receives.

The encryption/decryption module is in the form of an autonomous module. For example, this encryption/decryption module is nowadays integrated in a chip card which must be inserted in the decoder in order for the decoder to function correctly.

Nowadays, there are a number of decoders which have been fraudulently constructed in order to receive payment-based television channels without paying. These decoders are referred to as pirate decoders. Since the encryption/decryption part of the signals received is the most complex, these pirate decoders most often integrate an authentic encryption/decryption module which is associated with a fraudulent device for controlling this module. The fraudulent control device transmits to the authentic encryption/decryption module the information it requires for decrypting the payment-based television channels, even if the information has been acquired in a fraudulent manner.

In order to combat pirate decoders of this type, the solution has for some time consisted in broadcasting, via the transmitter, special corrective software programs referred to as anti-pirate programs. These anti-pirate corrective software programs are intended to modify the operation of the authentic encryption/decryption module so that the pirate decoder as a whole becomes unusable. An anti-pirate corrective software program, after it has been carried out by the authentic encryption/decryption module, may, for example, modify the location of the memory zones in which the information decrypted by the authentic encryption/decryption module is stored, or seek the information required for decrypting television channels in another memory location.

However, the most recent pirate decoders are now capable of removing the anti-pirate corrective software programs before they are received by the authentic encryption/decryption module. The anti-pirate corrective software programs are thus not carried out by the authentic encryption/decryption module.

The object of the invention is to overcome this disadvantage by providing a method in which it is made more difficult to remove a software program transmitted to a decoder.

BRIEF SUMMARY OF THE INVENTION

The subject-matter of the invention is therefore a method as described above, characterised:

in that the transmitter inserts in the message transmitted during step b) an additional item of information which allows the at least one encryption/decryption module to verify that it has effectively received the or each computer software program transmitted at step c), in that the at least one encryption/decryption module verifies, based on the additional information inserted by the transmitter in the message transmitted during step b), whether it has effectively received the or each software program transmitted during step c), and in that, if the or each software program has not been received, the at least one encryption/decryption module prevents step d).

In the above method, the authentic encryption/decryption module with which the decoder is equipped receives the message containing the information required to decrypt the encrypted information signals transmitted by the transmitter. This message further contains information which allows it to verify that all the corrective software programs transmitted by the transmitter have been communicated to it.

Consequently, if the authentic encryption/decryption module detects, from the additional information inserted in the message transmitted at step b), that a corrective software program is missing, this authentic encryption/decryption module acts so as to prevent the information transmitted during step a) from being decrypted.

This method makes it more difficult to remove the corrective software programs transmitted during step c).

If the pirate decoder allows through the message containing the additional information for verifying the presence of all the corrective software programs transmitted, the information is received by the authentic encryption/decryption module. The encryption/decryption module is therefore capable of detecting the removal of a corrective software program and in response prevents the decryption of the information signals transmitted during step a), that is to say, for example, television channels.

Thus, if the pirate decoder allows through the message containing the additional information, it must also allow through all the corrective software programs transmitted during step c).

Furthermore, the pirate decoder cannot simply be modified in order to also remove the message containing the additional information transmitted during step b). This message also contains the information required for decrypting the signals transmitted during step a). Consequently, if this message is removed, it is impossible to decrypt the information signals transmitted during step a).

Consequently, owing to a method of this type, it is no longer sufficient for pirate decoders to simply remove specific information messages or corrective software programs received, and they must gain access to the content of the message transmitted during step b) which is significantly more complex than purely and simply removing specific messages received.

According to other features of the method according to the invention:
  the transmitter encrypts the message transmitted at step b), and the at least one encryption/decryption module decrypts the message transmitted during step b) in order to allow step d) to be carried out;
  the transmitter carries out:

e) a step for constructing a first identifier of the or each computer software program transmitted during step c), and f) a step for inserting this identifier in the message transmitted during step b), and the at least one encryption/decryption module carries out:

g) a step for reconstructing the identifier of the or each computer software program based on the or each computer software program received, h) a step for comparing the identifier reconstructed at step g) with the identifier inserted by the transmitter during step f), and i) if the identifier reconstructed at step g) does not correspond to that inserted at step f) in the message transmitted at step b), a step for preventing step d), j) if the identifier reconstructed at step g) corresponds to the identifier inserted at step f) in the message transmitted during step b), a step for validating the integrity of the or each computer software program;
  in order to ensure the integrity of a group of several computer software programs which can each be carried out by the at least one encryption/decryption module, step e) comprises an operation for constructing a single identifier for the group of several computer software programs to be transmitted during step c) based on information relating to each of the software programs of the group and step g) consists in carrying out the same operation as that carried out during step e) in order to reconstruct a unique identifier corresponding to that constructed during step e) if the group received by the decoder is identical to that transmitted by the transmitter;
  steps d), g), h), i) and j) are carried out by the same encryption/decryption module;
  a first autonomous encryption/decryption module carries out only steps d), h), i) and j) and a second autonomous encryption/decryption module which is independent from the first encryption/decryption module and which is fixedly joined to the decoder carries out at least step g);
  the transmitter further carries out:

k) a second step for constructing a second identifier of the or each computer software program transmitted during step c), this second identifier being transmitted together with the or each corresponding software program during step c), and
  step g) which is carried out by the second encryption/decryption module comprises:
    an operation for reconstructing the second identifier which is transmitted together with the or each software program,
    only if the second reconstructed identifier corresponds to that transmitted together with the or each software program during step c), an operation for reconstructing the first identifier inserted in the message transmitted during step b) and for transmitting this first reconstructed identifier to the first encryption/decryption module so that the first encryption/decryption module can carry out step h);
  the first and the second identifiers are obtained from the same identifier of the or each computer software program by encrypting the same identifier using a different first and second encryption key, respectively;
  the at least one encryption/decryption module carries out the at least one computer software program each time the integrity thereof is validated during step j).

The invention also relates to an information recording medium comprising instructions for carrying out a method according to the invention, when the instructions are carried out by the transmitter.

The invention also relates to an information recording medium comprising instructions for carrying out a method according to the invention, when the instructions are to be carried out by the at least one encryption/decryption module.

The invention also relates to a system for ensuring the integrity of at least one computer software program which can be carried out by at least one encryption/decryption module, the system comprising a transmitter for transmitting the at least one computer software program via a long-distance information transmission network, and a decoder which is equipped with the at least one encryption/decryption module, the transmitter being capable of:

encrypting information signals transmitted to the or each decoder, transmitting to the at least one encryption/decryption module of the decoder a message containing the information required for the decoder to decrypt the information signals transmitted, and transmitting the at least one computer software program to the at least one encryption/decryption module of the decoder, transmitting the at least one computer software program to the at least one encryption/decryption module of the decoder, the decoder being capable of decrypting the information signals transmitted by the transmitter using the information which is provided for this purpose and which is contained in the message transmitted by the transmitter, characterised:

in that the transmitter is capable of inserting in the message an additional item of information which allows the at least one encryption/decryption module to verify that it has received the or each computer software program transmitted, in that the at least one encryption/decryption module is capable of verifying, based on the additional information inserted by the transmitter in the message, whether it has effectively received the or each software program transmitted by the transmitter, and in that, if the or each software program has not been received, the at least one encryption/decryption module is capable of preventing the decryption of the information signals transmitted.

According to other features of the system according to the invention:

the or each decoder is equipped with a single removable encryption/decryption module;

the or each decoder is equipped with at least two autonomous encryption/decryption modules which are independent from each other, at least one of these encryption/decryption modules being fixedly joined to the body of the decoder.

BRIEF DESCRIPTION OF THE SEVERAL VIEWS OF THE DRAWING

The invention will be better understood from a reading of the following description, given purely by way of example and with reference to the drawings, in which.

DETAILED DESCRIPTION OF THE INVENTION

Figure 1:
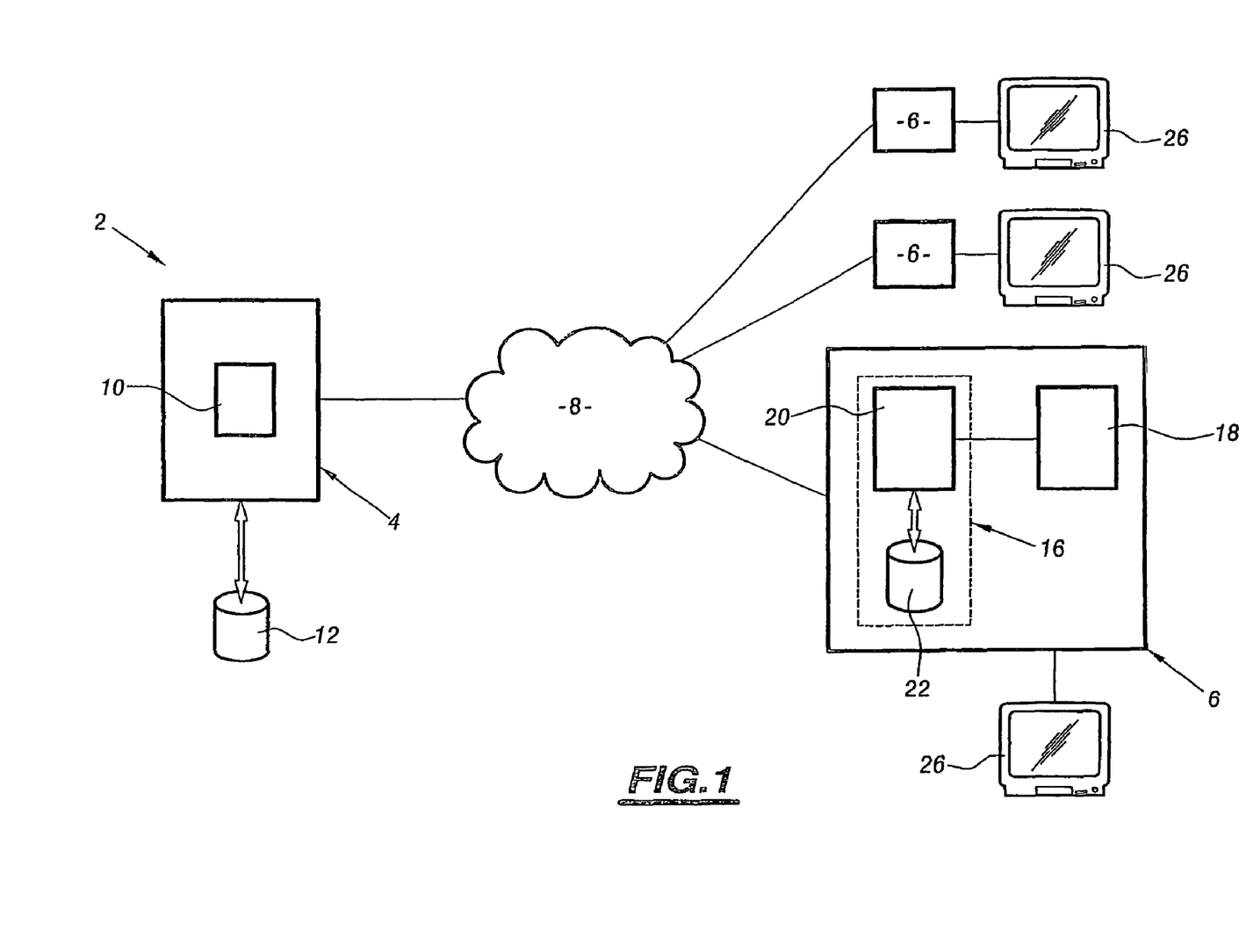
FIG. 1 is a schematic view of the architecture of a first embodiment of a system according to the invention.

FIG. 1 illustrates a payment-based system for transmission of television channels. This system is generally designated 2. Payment-based systems for transmission of television channels are known. Consequently, only the features required for an understanding of the invention will be described in detail in this instance.

The system 2 comprises a transmitter 4 for encrypted television channels, decoders 6 which are capable of decrypting these television channels, and a long-distance information transmission network 8 which connects the transmitter 4 to the decoders 6. This network 8 is typically a wireless network.

The transmitter 4 is capable of broadcasting, via the network 8, to all the decoders 6 of the system 2, encrypted information signals, coded messages containing information required for decrypting the information signals and non-encrypted corrective software programs. The encrypted information signals correspond in this case to television channels which are scrambled using a control word, this control word forming the information required to decrypt or unscramble these television channels. To this end, the transmitter 4 comprises a unit 10 which is capable of carrying out operations for scrambling the broadcast television channels and operations for encoding the message containing the control word used to scramble the television channels.

This unit 10 is produced in this instance on the basis of conventional programmable computers which are capable of carrying out instructions which are recorded on an information recording medium, in this instance a memory 12. The memory 12 comprises instructions for carrying out the method of FIG. 2 when these instructions are carried out by the unit 10. Furthermore, this memory 12 comprises the encryption keys and the control word(s) required for carrying out the method of FIG. 2.

The decoders 6 are all capable of decrypting or unscrambling the television signals transmitted by the transmitter 4 using the information contained in the messages transmitted by the same transmitter 4.

Thus, since all these decoders 6 perform similar functions, only one of these decoders 6 is illustrated in detail in FIG. 1 in order to simplify the illustration.

The decoder 6 comprises an encryption/decryption module 16 which is capable of decoding the coded message transmitted by the transmitter 4 in order to extract the control word therefrom and transmit it to a module 18 for unscrambling the scrambled television channels.

The module 16 comprises a conventional programmable computer 20 and a recording medium which is formed in this case by a memory 22. The computer 20 is capable of carrying out instructions which are recorded in the memory 20. In this instance, the memory 20 comprises instructions for carrying out the method of FIG. 2 when these instructions are carried out by the computer 20. The module 16 is removable. It is produced, for example, based on a conventional chip card.

The decoder 6 is associated with a television set 26 which is capable of displaying the television channels unscrambled by the decoder 6.

The operation of the system 2 will now be described with reference to the method of FIG. 2.

The transmitter 4 carries out a step 36 for encrypting and transmitting information to all the decoders of the system 2 via the network 8. The information transmitted by the transmitter 4 to the decoders 6 comprises scrambled television channels, messages containing the information required for a decoder to be able to unscramble these television channels and occasionally corrective software programs which are intended to update the decoders 6. In this manner, during step 36, the transmitter 4 scrambles, during a sub-step 40, the television channel(s) broadcast using a control word which is stored in the memory 12. This sub-step 40 is conventional.

At the same time, the transmitter 4 transmits, during a sub-step 42, corrective software programs which are non-coded, that is to say, non-encrypted, to the decoders 6. These corrective software programs are each conventionally associated with an identifier CS which allows the decoder which receives them to verify the integrity of each of the software programs received. The identifier CS is, for example, in this instance a "checksum".

During the sub-step 42, the transmitter 4 also carries out an operation 44 for constructing a unique identifier which allows the detection, by means of each decoder 6, of the absence or modification of one of the corrective software programs received among the plurality of corrective software programs transmitted by a transmitter 4. To this end, for example, the transmitter 4 combines all the checksums of each of the corrective software programs by carrying out an EXCLUSIVE OR operation between each of the checksums.

Then, the transmitter 4 codes, during an operation 46, the unique identifier constructed during the operation 44 using an encryption key $K_{cs}$ which is contained, for example, in the memory 12. The coding of the unique identifier allows the transmission thereof via the network 8 to be made secure since only decoders equipped with an encryption key corresponding to the encryption key $K_{cs}$ will be capable of decoding this unique identifier.

In this instance, it is the unique identifier which is coded to secure the transmission of the corrective software programs rather than the corrective software programs themselves since this makes the method faster. Since the unique identifier is smaller in size than the group of corrective software programs transmitted, the coding thereof is therefore much faster.

During step 36, the transmitter 4 also carries out a sub-step 50 for transmitting a message for controlling the access rights which have been coded using an encryption key $K_{ECM}$. The message is also referred to as an ECM message (Entitled Control Message). The ECM message conventionally comprises the control word required to unscramble the television signals transmitted during the sub-step 40.

In this instance, during sub-step 50, the transmitter 4 inserts, during an operation 52, the unique identifier which has been coded during the operation 46.

At step 60, each decoder receives the information transmitted by the transmitter 4 via the network 8. All of the information received is transmitted to the encryption/decryption module 16.

The module 16 begins by reconstructing, during an operation 62, the unique identifier based on all the corrective software programs received. This operation 62 is, for example, identical to the operation 44 so that the unique identifier reconstructed by the module 16 is identical to the unique identifier constructed during the operation 44 if all the corrective software programs received are identical to those transmitted during sub-step 42.

The module 16 then decodes the ECM message received using an encryption key $K_{ECM}$ corresponding to that used by the transmitter 4.

Once the ECM message has been decoded, the module 16 then decodes the unique identifier contained in this ECM message during an operation 64.

During an operation 66, it then compares the unique identifier reconstructed during the operation 62 with that decoded during the operation 64. If the unique identifiers compared are not identical in spite of several attempts by the transmitter to transmit various corrective software programs, the module 16 then carries out a step 68 for preventing the unscrambling of the television channels. To this end, for example, the module 16 does not transmit to the unscrambling module 18 the control word contained in the ECM message received or transmits an erroneous control word.

Otherwise, that is to say, if the two identifiers compared correspond, the module 16 then carries out, during an operation 70, the corrective software programs received and transmits, during an operation 72, the control word contained in the ECM message to the unscrambling module 18 which unscrambles the television channels during an operation 74.

In this manner, if the module 16 is used in a pirate decoder and the pirate decoder removes or modifies an anti-pirate corrective software program before transmitting it to the module 16, the module 16 carries out the operation 68 and the television channels received are no longer unscrambled correctly.

Figure 2:
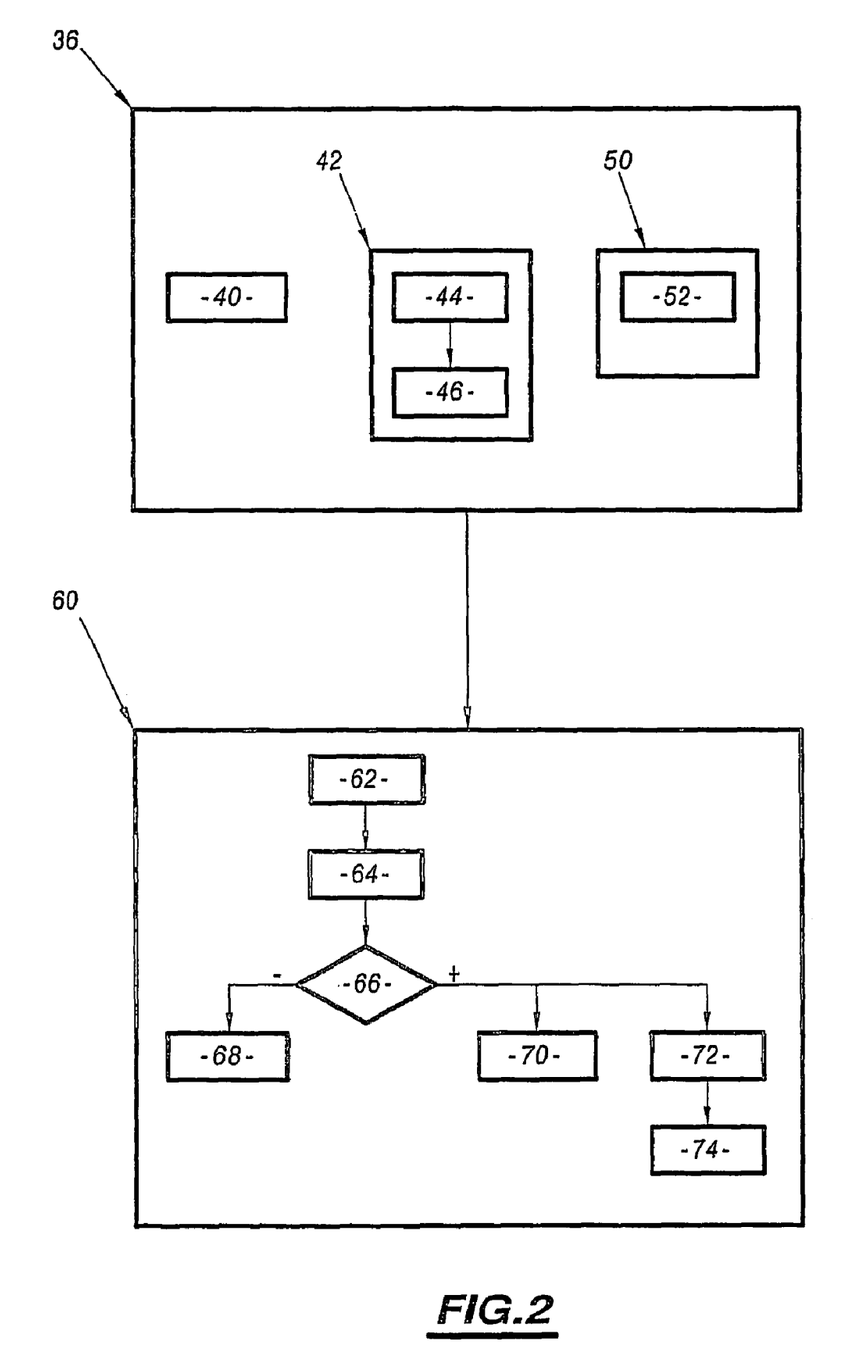
FIG. 2 is a flow chart of a method according to the invention, carried out in the system of FIG. 1.

It should also be noted that the method of FIG. 2 also prevents corrective software programs from being added to those transmitted by the transmitter 4 by an unscrupulous individual equipped with his own transmitter which is connected to the network 8. Additional corrective software programs of this type which are added by unscrupulous individuals are often intended to either destroy the module 16 or render it inoperative. These corrective software programs added by unscrupulous individuals may be in the form of computer viruses.

In the method of FIG. 2, the addition of a corrective software program is detected in the same manner as the removal or the modification of a corrective software program during the operation 66 and this corrective software program which has been added will not be carried out.

It has been noted that falsified chip cards currently exist which are capable of replacing the authentic module 16 in a decoder which is itself authentic.

Figure 3:
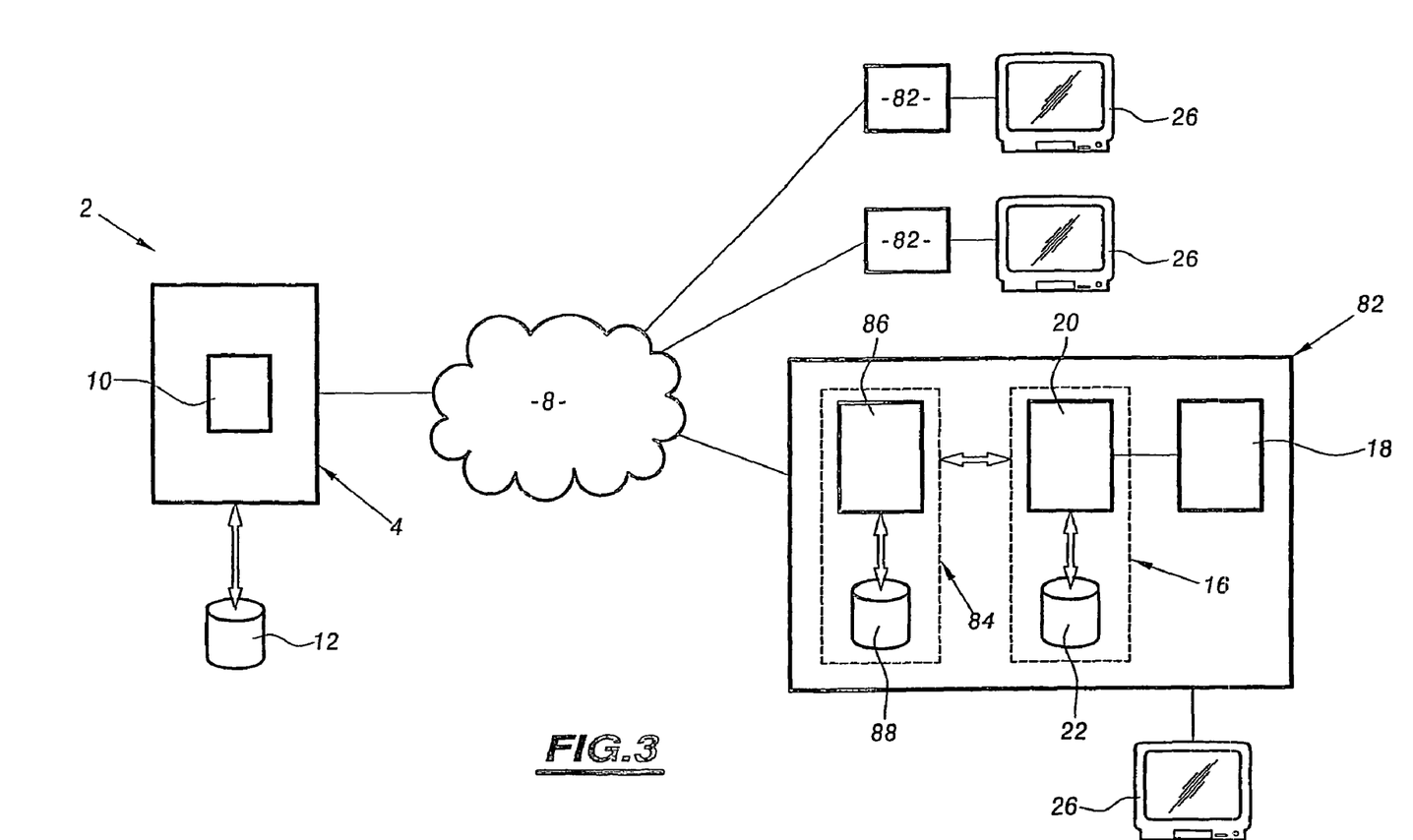
FIG. 3 is a schematic view of the structure of a second embodiment of a system according to the invention.

An authentic decoder of this type which is equipped with a falsified chip card cannot be made unusable, even by implementing the method according to FIG. 2, since the falsified chip card does not carry out the operations 62 to 68. The second embodiment described with reference to FIG. 3 is an improvement of the system of FIG. 1 which is intended to overcome this disadvantage.

Figure 4:
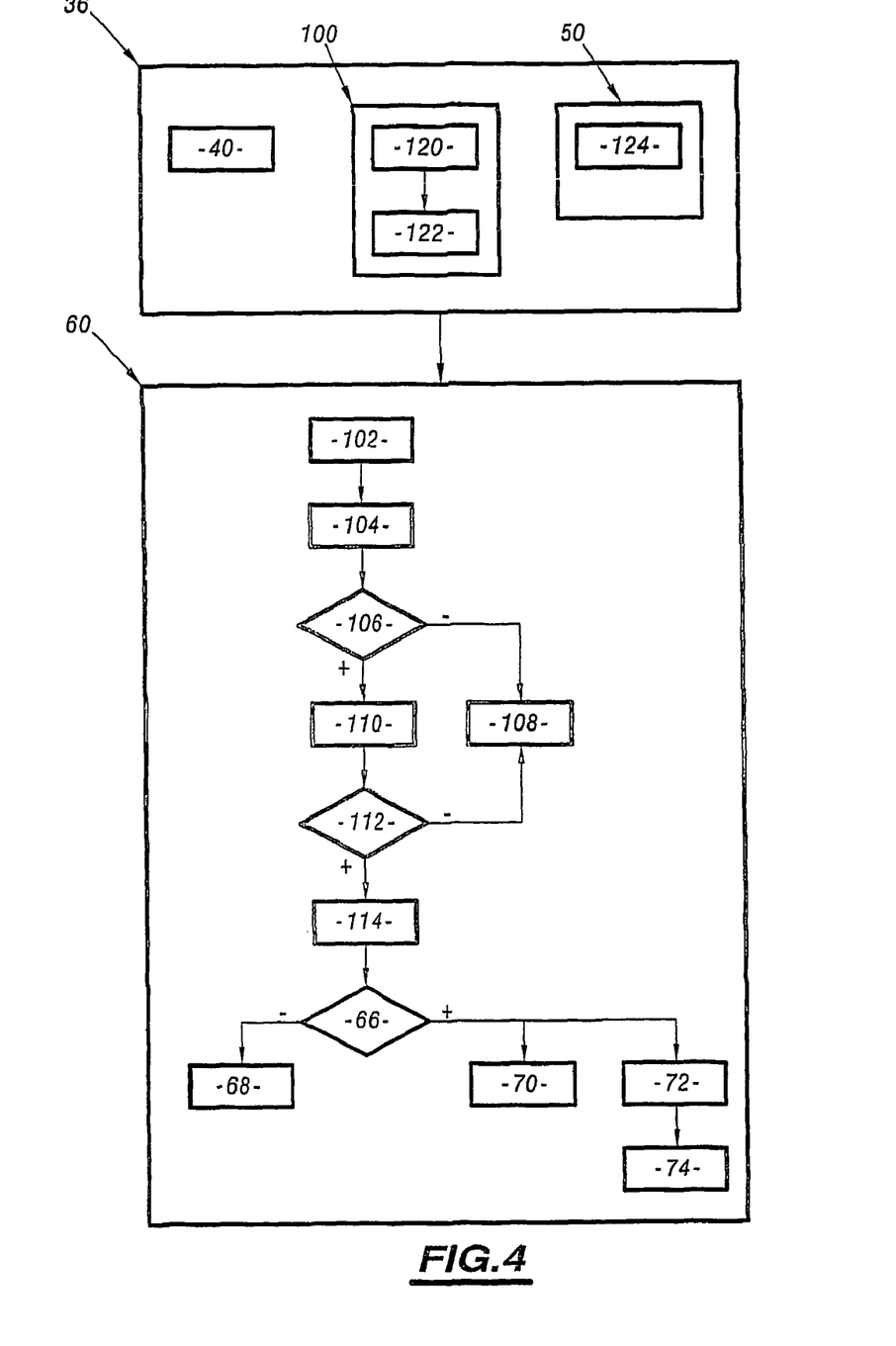
FIG. 4 is a flow chart of a method according to the invention carried out in the system of FIG. 3.

In this second embodiment, the transmitter only differs from the transmitter 4 of FIG. 1 in that the memory 12 comprises instructions for carrying out the method of FIG. 4 when they are carried out by the encryption/decryption module of this transmitter and the decoders 6 are replaced by decoders 82.

The decoders 82 are structurally identical to the decoder 6 apart from the fact that it comprises a second encryption/decryption module 84.

The module 84 is similar to the module 16 and comprises a computer 86 which is associated with a memory 88.

However, in contrast to the module 16, the module 84 is fixedly joined to the body of the decoder so that any attempt to remove this module 84 from the decoder 82 results in destruction of the decoder 82.

To this end, for example, the module 84 will be integrated inside an electronic component which is required for the operation of the decoder 82.

The memories 88 and 22 comprise instructions for carrying out the method of FIG. 4 when they are carried out by the computers 86 and 20, respectively.

The other elements are identical to those of FIG. 1 and have the same references.

The operation of this second embodiment will now be described with reference to the method of FIG. 4.

The method of FIG. 4 differs from the method of FIG. 2 substantially in that the sub-step 42 and the operation 62 are replaced by a sub-step 100 and operations 102 to 114, respectively.

The transmitter 4 transmits one or more corrective software programs to the decoders 82 during the sub-step 100.

For each corrective software program which is transmitted or which is to be transmitted, the transmitter 4 constructs a first identifier of the corrective software program to be transmitted during an operation 120 and a second identifier for this same corrective software program during an operation 122. In this instance, during the operation 120, the transmitter 4 calculates in conventional manner an electronic signature of the corrective software program to be transmitted, then codes this electronic signature using an encryption key $K_{MS}$.

In a similar manner to that which has been described with reference to the sub-step 42, this signature allows the corrective software program transmitted to be identified and the coding allows the transmission of the corrective software program to be made secure.

During the operation 122, the transmitter constructs the second identifier of the corrective software program to be transmitted by coding the electronic signature calculated during the operation 120 using an encryption key $K_{CS}$ before it is coded using the key $K_{MS}$.

Each corrective software program accompanied by its electronic signature calculated during the operation 120 is transmitted to the decoders 82 at the end of the sub-step 100.

In this instance, the operation 52 for inserting a unique identifier in the ECM message transmitted is replaced by an operation 124 for inserting in this ECM message the second identifier calculated for each corrective software program during the operation 122.

Thus, in this second embodiment, the ECM message does not comprise a unique identifier, but instead as many second identifiers as corrective software programs transmitted.

When the information transmitted by the transmitter 4 is received by the decoders 82, the module 84 reconstructs, during the operation 102, the first identifier for each corrective software program received. To this end, it calculates the electronic signature of the corrective software program received using the same algorithm as that used during the operation 120.

Thus, if the corrective software program received is identical to that transmitted by the transmitter 4, the reconstructed signature is identical to that coded using the key $K_{MS}$ during the operation 120.

Then, the module 84 decrypts, during the operation 104, the electronic signature transmitted with the corrective software program received during the sub-step 100.

The module 84 then compares, during the operation 106, the electronic signature reconstructed during the operation 102 with that decoded during the operation 104. If the signatures which have been reconstructed and decoded do not correspond, the module 84 interrupts, during an operation 108, the processing of this corrective software program.

Otherwise, that is to say, if the electronic signatures correspond, the module 84 reconstructs, during an operation 110, the second identifier of this corrective software program received. Typically, this operation 110 is identical to the operation 122 applied to the electronic signature obtained either during the operation 102 or during the operation 104.

Afterwards, the module 84 decodes the ECM message in order to extract therefrom the second identifier corresponding to the corrective software program received. It then compares, during the operation 112, the second identifier extracted from the ECM message with that reconstructed during the operation 110. If these second identifiers are not identical, then the module 84 immediately carries out the operation 108.

Otherwise, that is to say, if the second identifier reconstructed corresponds to that received via the ECM message, the module 84 then carries out the corrective software program if it is intended for the module.

Finally, the module 84 transmits, during an operation 114, the second identifier reconstructed during the operation 110 to the module 16.

The operation 112 in this instance ensures that no corrective software program has been removed.

The module 16 then immediately carries out the operation 66 during which it compares the second identifier transmitted by the module 84 to that contained in the ECM message. The remainder of the operations carried out by the module 16 are identical to those described with reference to FIG. 2.

In the method of FIG. 4, the absence of a corrective software program can be detected both by the module 84 and the module 20. If the absence of the corrective software program is detected by the module 84, it immediately interrupts the processing thereof and therefore does not transmit the second reconstructed identifier to the module 16. When the module 16 does not receive the second identifier, it automatically carries out the operation 68 in order to prevent the television channels from being unscrambled.

Thus, as in the first embodiment, the absence, addition or modification of a corrective software program relative to those transmitted during the sub-step 100 causes the unscrambling of the television channels to be stopped.

In contrast to the first embodiment, however, even if the module 16 is a falsified module which is provided in order to decrypt the ECM message, even if the corrective software programs are modified, added or absent, it is still possible to manipulate this decoder 82 in order to render it inoperative. For example, to this end, a corrective software program will be transmitted to the module 84 which, after carrying it out, will manipulate the decoder in order to render it inoperative. For example, the module 84 will directly manipulate the unscrambling module 18. Thus, a manufacturer of a pirate decoder will have, in this second embodiment, to not only falsify the module 16 but also the module 84. Since the module 84 is fixedly joined to and cannot be removed from the body of the decoder 82, the manufacturer of a pirate decoder will also have to falsify the decoder as a whole. The method of FIG. 4 therefore makes it very difficult to use authentic parts or encryption/decryption modules in pirate decoders.

Finally, it should be noted that a manufacturer of pirate decoders who is confronted with the method of FIG. 2 or 4 and who wishes to use an authentic encryption/decryption module in his pirate decoder must eliminate or modify the additional information inserted in the ECM message during steps 52 or 124 in order to prevent his pirate decoder from being vulnerable. To this end, he must be capable of decoding the ECM message, that is to say, he must in any case integrate a falsified encryption/decryption module in his pirate decoder. Under these conditions, the use of an authentic encryption/decryption module in a pirate decoder is no longer advantageous.

The systems and methods described in this instance have been described in the specific case of a payment-based transmission system for broadcasting television channels. However, the methods described can be applied to any system for transmission of encrypted information in which the receivers which form decoders are equipped with one or more encryption/decryption modules. A receiver of this type which forms a decoder equipped with an encryption/decryption module and, for example, a mobile telephone which is equipped with a SIM card (Subscriber Identity Module) or a computer which is capable of receiving coded software programs.

In particular, it should be noted that in such systems other than a transmission system for broadcasting television channels, the information signal is not necessarily scrambled but can also be coded.

The checksum is replaced in one variant by an electronic signature.

The system and method described in this instance have been described in the specific case in which the various encryption/decryption operations used are carried out using asymmetric encryption algorithms so that the key for encryption is the same as that for decryption. An asymmetric encryption algorithm of this type is, for example, the DES algorithm. In one variant, some or all of these encryption/decryption operations are carried out using asymmetric encryption/decryption algorithms such as, for example, the RSA algorithm. In this variant, the memories of the transmitter and the decoders must be adapted to comprise the appropriate encryption/decryption keys. In particular and preferably, the encryption algorithms used during the operations 120 and 122 are different algorithms so that the security of the method is increased. The decryption operations corresponding to the operations 120 and 122 therefore also use different decryption algorithms.

The invention claimed is:

1. A method for ensuring the integrity of a plurality of computer software programs carried out by means of at least one encryption/decryption module, the plurality of computer software programs being transmitted, by means of a transmitter, to a decoder which is equipped with the at least one encryption/decryption module by means of a long-distance information transmission network, the transmitter performing the steps comprising:
   a) a step (40) for encrypting information signals transmitted to the decoder,
   b) a step (50) for transmitting, to the at least one encryption/decryption module of the decoder, a message containing the information required for the decoder to decrypt the information signals transmitted at step a), and
   c) a step (42, 100) for transmitting the plurality of computer software programs to the at least one encryption/decryption module of the decoder,
   the decoder carrying out:
   d) a step (74) for decrypting the information signals transmitted by the transmitter during step a) using the information provided for this purpose in the message transmitted during step b),
   e) a step for constructing a single identifier for the plurality of computer software programs to be transmitted during step c) based on information relating to each of the computer software programs of the plurality of computer software programs and in that the at least one encryption/decryption module carries out the same operation as that carried out during step e) in order to reconstruct a unique identifier corresponding to that constructed during step e) upon the plurality of computer software programs received by the decoder being identical to that transmitted by the transmitter,
   wherein,
   the transmitter inserts (at 52, 124) in the message transmitted during step b) an additional item of information which allows the at least one encryption/decryption module to verify that it has effectively received each computer software program transmitted at step c),
   the at least one encryption/decryption module verifies (at 60), based on the additional information inserted by the transmitter in the message transmitted during step b), whether it has effectively received each computer software program of the plurality of computer software programs transmitted during step c), and
   upon each software program of the plurality of computer software programs having not been received, the at least one encryption/decryption module prevents step d) (at 68).

2. The method according to claim 1, wherein the transmitter encrypts (at 50) the message transmitted at step b), and in that the at least one encryption/decryption module decrypts the message transmitted during step b) in order to allow step d) to be carried out.

3. The method according to claim 1, wherein the transmitter carries out:
   f) a step (52, 124) for inserting this identifier in the message transmitted during step b),
   and in that the at least one encryption/decryption module carries out:
   g) a step (62, 110) for reconstructing the identifier of each computer software program based on each computer software program of the plurality of computer software programs received,
   h) a step (66, 112) for comparing the identifier reconstructed at step g) with the identifier inserted by the transmitter during step f), and
   i) upon the identifier reconstructed at step g) not corresponding to that inserted at step f) in the message transmitted at step b), a step (68, 108) for preventing step d),
   j) upon the identifier reconstructed at step g) corresponding to the identifier inserted at step f) in the message transmitted during step b), a step (66, 112) for validating the integrity of each computer software program of the plurality of computer software programs.

4. The method according to claim 3, wherein the steps d), g), h), i) and j) are carried out by the same encryption/decryption module.

5. The method according to claim 3, wherein a first autonomous encryption/decryption module carries out only steps d), h), i) and j), and in that a second autonomous encryption/decryption module which is independent from the first encryption/decryption module and which is fixedly joined to the decoder carries out at least step g).

6. A method for ensuring the integrity of a plurality of computer software programs carried out by means of at least one encryption/decryption module, the plurality of computer software programs being transmitted, by means of a transmitter, to a decoder which is equipped with the at least one encryption/decryption module by means of a long-distance information transmission network, the transmitter performing the steps comprising:
   a) a step (40) for encrypting information signals transmitted to the decoder,
   b) a step (50) for transmitting, to the at least one encryption/decryption module of the decoder, a message containing the information required for the decoder to decrypt the information signals transmitted at step a), and
   c) a step (42, 100) for transmitting the plurality of computer software programs to the at least one encryption/decryption module of the decoder,
   the decoder carrying out:
   d) a step (74) for decrypting the information signals transmitted by the transmitter during step a) using the information provided for this purpose in the message transmitted during step b),
   e) a step for constructing a single identifier for the plurality of computer software programs to be transmitted during step c) based on information relating to each of the computer software programs of the plurality of computer software programs and in that the at least one encryption/decryption module carries out the same operation as that carried out during step e) in order to reconstruct a unique identifier corresponding to that constructed during step e) upon the plurality of computer software programs received by the decoder being identical to that transmitted by the transmitter, f) a step (52, 124) for inserting this identifier in the message transmitted during step b), and in that the at least one encryption/decryption module carries out:

g) a step (62, 110) for reconstructing the identifier of each computer software program based on each computer software program of the plurality of computer software programs received, h) a step (66, 112) for comparing the identifier reconstructed at step g) with the identifier inserted by the transmitter during step f), and i) upon the identifier reconstructed at step g) not corresponding to that inserted at step f) in the message transmitted at step b), a step (68, 108) for preventing step d), j) upon the identifier reconstructed at step g) corresponding to the identifier inserted at step f) in the message transmitted during step b), a step (66, 112) for validating the integrity of each computer software program of the plurality of computer software programs, wherein, the transmitter inserts (at 52, 124) in the message transmitted during step b) an additional item of information which allows the at least one encryption/decryption module to verify that it has effectively received each computer software program transmitted at step c), the at least one encryption/decryption module verifies (at 60), based on the additional information inserted by the transmitter in the message transmitted during step b), whether it has effectively received each computer software program transmitted during step c), and upon each software program of the plurality of computer software programs having not been received, the at least one encryption/decryption module prevents step d) (at 68), a first autonomous encryption/decryption module carries out only steps d), h), i) and j), and in that a second autonomous encryption/decryption module which is independent from the first encryption/decryption module and which is fixedly joined to the decoder carries out at least step g), and wherein the transmitter further performing the steps comprising:

k) a second step (120) for constructing a second identifier of each computer software program transmitted during step c), this second identifier being transmitted together with each corresponding computer software program during step c), and step g) which is carried out by the second encryption/decryption module comprises:

an operation (102) for reconstructing the second identifier which is transmitted together with each computer software program, only upon the second reconstructed identifier corresponding to that transmitted together with each software program of the plurality of computer software programs during step c), an operation (110) for reconstructing the first identifier inserted in the message transmitted during step b) and for transmitting this first reconstructed identifier to the first encryption/decryption module so that the first encryption/decryption module can carry out step h).

7. The method according to claim 6, wherein the first and the second identifiers are obtained from the same identifier of each computer software program of the plurality of computer software programs by encrypting the same identifier using a different first and second encryption key, respectively.

8. The method according to claim 2, wherein the at least one encryption/decryption module carries out the plurality of computer software programs each time the integrity thereof is validated during step j).

9. An information recording medium (12) with a computer program recorded thereon comprising instructions for carrying out a method according to claim 1, when the instructions are carried out by the transmitter (4).

10. An information recording medium (22, 88) with a computer program recorded thereon comprising instructions for carrying out a method according to claim 1, when the instructions are to be carried out by the at least one encryption/decryption module.

11. A system for ensuring the integrity of plurality of computer software programs carried out by at least one encryption/decryption module (16, 84), the system comprising:

a transmitter (4) for transmitting the plurality of computer software programs via a long-distance information transmission network (8), and a decoder (6, 82) which is equipped with the at least one encryption/decryption module (16, 84), the transmitter (4) performs the steps of:

encrypting information signals transmitted to the or each decoder, transmitting to the at least one encryption/decryption module of the decoder a message containing the information required for the decoder to decrypt the information signals transmitted, and transmitting the plurality of computer software programs to the at least one encryption/decryption module of the decoder, the decoder (6, 82) decrypts the information signals transmitted by the transmitter using the information which is provided for this purpose and which is contained in the message transmitted by the transmitter, constructing a single identifier for the plurality of computer software programs to be transmitted during the transmitting the plurality of computer software programs to the at least one encryption/decryption module of the decoder based on information relating to each of the computer software programs of the plurality of computer software programs and in that the at least one encryption/decryption module carries out the same operation as that carried out during construction in order to reconstruct a unique identifier corresponding to that constructed during construction upon the plurality of computer software programs received by the decoder being identical to that transmitted by the transmitter, wherein, the transmitter (4) inserts in the message an additional item of information which allows the at least one encryption/decryption module (46, 84) to verify that it has received each computer software program of the plurality of computer software programs transmitted, the at least one encryption/decryption module (16, 84) verifies, based on the additional information inserted by the transmitter in the message, whether it has effectively received each computer software program of the plurality of computer software programs transmitted by the transmitter, and upon each computer software program of the plurality of computer software programs having not been received, the at least one encryption/decryption module (16, 84) prevents the decryption of the information signals transmitted.

12. The system according to claim 11, wherein the or each decoder (6) is equipped with a single removable encryption/decryption module.

13. The system according to claim 11, wherein the or each decoder (82) is equipped with at least two autonomous encryption/decryption modules which are independent from each other, at least one of these encryption/decryption modules being fixedly joined to the body of the decoder.

14. The method according to claim 1, wherein the transmitter performs the steps of:
   encrypting information signals transmitted to the or each decoder,
      transmitting to the at least one encryption/decryption module of the decoder a message containing the information required for the decoder to decrypt the information signals transmitted, and
   transmitting the plurality of computer software programs to the at least one encryption/decryption module of the decoder,
   wherein
   the transmitter (4) inserts in the message an additional item of information which allows the at least one encryption/decryption module (46, 84) to verify that it has received each computer software program transmitted.

15. The method according to claim 1, wherein the decoder decrypts the information signals transmitted by the transmitter using the information which is provided for this purpose and which is contained in the message transmitted by the transmitter, and being equipped with the at least one encryption/decryption module (16, 84);
   wherein,
      the at least one encryption/decryption module (16, 84) is capable of verifying, based on the additional information inserted by the transmitter in the message, whether it has effectively received each computer software program of the plurality of computer software programs transmitted by the transmitter, and
   upon each software program of the plurality of computer software programs having not been received, the at least one encryption/decryption module (16, 84) prevents the decryption of the information signals transmitted.

16. The method according to claim 15, wherein the decoder is equipped with a single removable encryption/decryption module.

17. The method according to claim 15, wherein the decoder is equipped with at least two autonomous encryption/decryption modules which are independent from each other, at least one of these encryption/decryption modules being fixedly joined to the body of the decoder.

18. The method according to claim 2, wherein the transmitter carries out:
   f) a step (52, 124) for inserting this identifier in the message transmitted during step b),
   and in that the at least one encryption/decryption module carries out:
   g) a step (62, 110) for reconstructing the identifier of each computer software program of the plurality of computer software programs based on each computer software program received,
   h) a step (66, 112) for comparing the identifier reconstructed at step g) with the identifier inserted by the transmitter during step f), and
   i) if the identifier reconstructed at step g) does not correspond to that inserted at step f) in the message transmitted at step b), a step (68, 108) for preventing step d),
   j) if the identifier reconstructed at step g) corresponds to the identifier inserted at step f) in the message transmitted during step b), a step (66, 112) for validating the integrity of each computer software program of the plurality of computer software programs.

19. The method according to claim 1, wherein a first autonomous encryption/decryption module carries out only steps d), h), i) and j), and in that a second autonomous encryption/decryption module which is independent from the first encryption/decryption module and which is fixedly joined to the decoder carries out at least step g).

\* \* \* \* \*